June 10, 1930.   E. ABORN   1,762,209
PROCESS OF COFFEE EXTRACTION
Filed Dec. 11, 1928   2 Sheets-Sheet 1
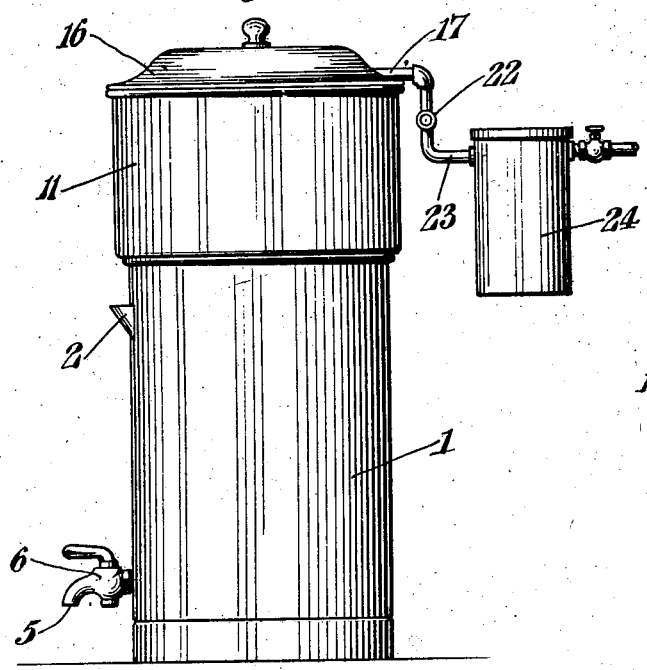
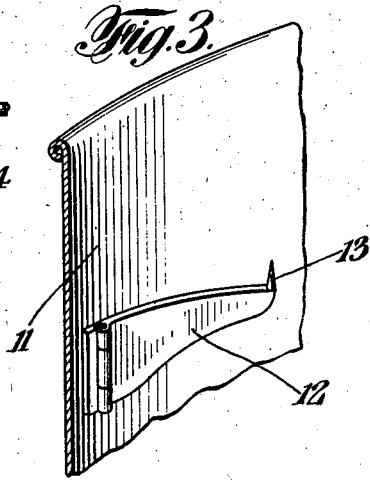
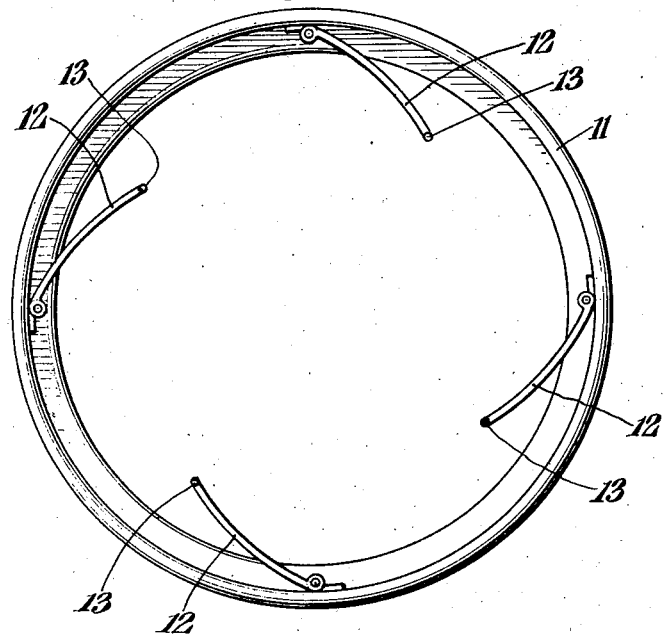
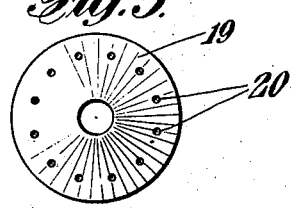
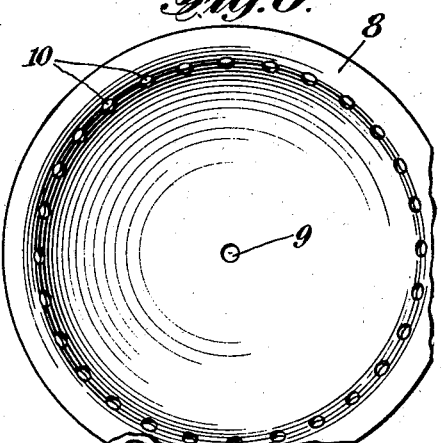
Edward Aborn
INVENTOR
Prindle, Wright, Neal & Bean
ATTORNEY

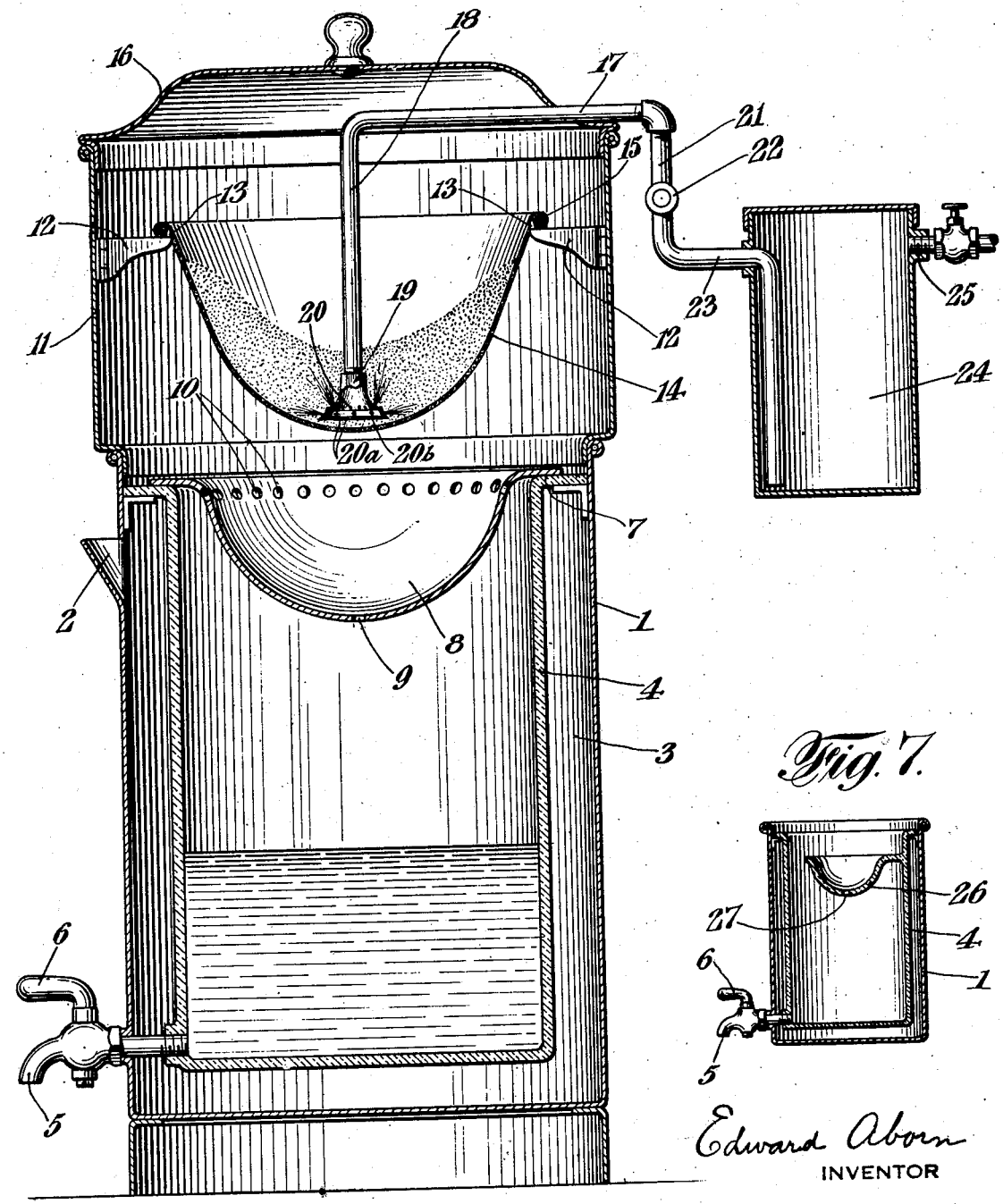
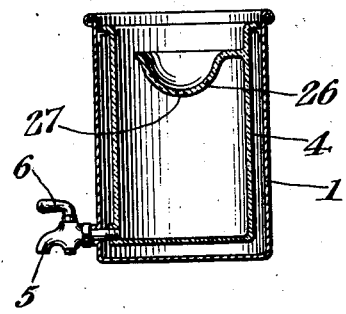

UNITED STATES PATENT OFFICE

EDWARD ABORN, OF EAST ORANGE, NEW JERSEY

PROCESS OF COFFEE EXTRACTION

Application filed December 11, 1928. Serial No. 325,296.

My invention relates particularly to a process of extracting coffee which is designed to secure many advantages as hereinafter referred to.

The object of my invention is to provide a process whereby coffee may be more quickly and more thoroughly extracted while at the same time securing a product of a much higher quality than has been obtainable in previous coffee extracting processes. The object of my invention is to provide such a process in which the water used for extracting the ground coffee is supplied to the lower portion of the ground coffee in a special way, thus preventing the coffee from compacting and rendering it more accessible to the liquid. This action, furthermore, has the effect of spreading the ground coffee upwardly around the edges of the body of coffee due to the laterally directed and upwardly directed currents of water so as to provide a more effective extraction of the coffee. The horizontal currents of water tend to loosen up the grounds and keep the grounds in circulation at the bottom, permitting free filtration, so as, together with the upwardly directed currents, to build them up in a curved layer on the wall of the retaining bag while the upwardly directed currents cause the water to lift and penetrate the coffee grounds so as to prevent them from forming lumps which are impenetrable because of the skin of water formed on them. This action causes the coffee to be extracted gradually, part of the coffee being floated upwardly to be last extracted by the water as the latter rises in the bag. This avoids leaching out the deleterious matters from the coffee which would occur in case the extraction of any part of the body of coffee should be continued for an undue length of time. Thus, in the action above referred to there is a pocket formed in the central part of the upper surface of the body of coffee which causes the water to seep out gradually through the sides of the body of coffee and, furthermore, prevents the water passing out above the level of the body of coffee without passing through the same. In other words, some of the water carrying the coffee extract goes directly down through the body of the bag and into the urn, carrying the desirable flavor elements but not having the undesirable constituents of the coffee bean. Much of the water, however, passes upwardly and outwardly through the coffee or along the walls of the retaining bag, efficiently extracting the coffee extract therefrom. The upper part of the coffee grounds at the upper annular elevated layer formed in the bag are only partially extracted initially, so as to make the same available for supplying coffee extract to the portions of the water supplied to the ground coffee toward the end of the coffee extraction operation. This action results in thoroughly and uniformly mixing the grounds and water with consequent uniform extraction thereof, even in the case of coffee ground to the finest point of pulverization. This not only gives a more perfect extract but enables a given quantity of coffee to be completely extracted in a shorter interval of time and the desired strength of coffee to be obtained from a much smaller weight of the coffee bean, without prolonged or repeated contact with the water.

While I effect a thorough contact between the water and ground coffee, I am also able to regulate the time of contact so as to insure quick brewing and avoid over-extraction, which leaches out the undesirable elements from the coffee bean. Furthermore, I am able to maintain the water at a much higher and more uniform temperature than would be possible if the water were poured upon the top of the body of coffee where it would have time to cool while waiting to come into contact with the coffee. As the water remains so much hotter, and as the extraction is very efficient in my process, it is not necessary to repour the liquid through the ground coffee. Furthermore, this method prevents the lack of uniformity which occurs in the case where a stream of water is supplied to the top of the ground coffee, which has the effect of digging a hole at the point of contact in the body of coffee. The radial horizontally and upwardly directed jets of water under pressure more effectively extract the aromatic flavor substance than when otherwise arranged.

The nozzle is designed with a nearly horizontal upper surface perforated with a calculated number and size of openings for jets of water directed upward at an angle, said jets being different in direction and number, but acting in co-ordination with the horizontally directed jets set in the side of the lower rim of the nozzle.

The nozzle is so designed that the lower circle of jets, with a governed supply of water issued in a horizontal direction, from an established position in a bed of finely ground coffee grounds, held in a cotton cloth filter bag, produce a desired amount of circulation of water and grounds at the exit point of the filter bag, preventing congestion at the bottom of the bag and establishing a continuous flow of efficiently extracted liquid coffee through the bag.

This action, together with the action of the upper circle of jets, establishes a thorough and uniformly governed mixture of water and grounds in all parts of the filter bag and a uniform rate of flow through the grounds and out of the bag. At the same time there is not too much circulation of water at the exit point which would cause too hasty a passage of water and an incomplete extraction. The action of the water so distributes the ground coffee that no water passes through the bag, at the top or at any point, without first passing through ground coffee.

Thus, also, by regulating the supply of water, as by the arrangement of the number and size of the holes in the nozzle used for supplying the water, the distribution and quantity of the water can be regulated. Furthermore, in order to further avoid stratification of the different strengths of coffee obtained in the brewing thereof I have provided means for equalizing the strengths of the coffee extracts by causing the successive extractions of the coffee to become mixed before being received in the body of the urn, whence it is drained off for use. Owing to the continuous filtering through of the water through the grounds without congesting or retarding of the flow, due to the excellent control by the streams, the application of the water is continuous and the flow does not have to be stopped until the whole measurement of water has been applied. This makes it possible to turn the valve supplying the hot water and leave it open until the whole amount of hot water has been used. This saves the delays caused by other methods which necessitate applying only a portion of the hot water at a time. The upwardly directed jets cause the water to pass upward through the mass of coffee grounds and at the same time raise the mass of coffee grounds in the water and also carry the coffee grounds themselves along the surface in the upper parts of the bag and so prevent the water from passing through such upper portion of the surface of the bag directly and without going through the coffee grounds. This floating of the upper portion of the grounds also tends to delay their extraction until the latter portion of the operation, thus establishing a more uniform strength as between the top and the bottom of the coffee. If it were not for the lower horizontal jets the grounds would pack in the bottom of the bag and clog the exit therefrom. This would cause the liquid to rise and overflow the top, requiring a metal or other solid structure to retain it, or an excessively high bag. The described arrangement gives a prompt but not too quick exit at the bottom, and the whole arrangement enables a comparatively shallow bag to be efficiently and successfully used. This method of operation is aided by the fact that the total volume of the horizontal jets is substantially less than that of the upwardly directed streams, as will be seen in the drawings. The operation of my process is so accurate that the bag will not overflow and the whole process or brewing will continue accurately and automatically.

While my invention is capable of being carried out in many different ways I have described herein only certain ways of proceeding in accordance with my invention, and while it is capable of being carried out in many different types of apparatus, I have shown only one form of the same in the accompanying drawings, in which—

Fig. 1 is a side elevation of a coffee apparatus which may be used with my invention;

Fig. 2 is a vertical section through the same;

Fig. 3 is an enlarged side elevation of one of the pivoted brackets for holding the coffee-filter-cloth frame;

Fig. 4 is a plan view showing the arrangement of the brackets within the top of the urn;

Fig. 5 is a plan view of the distributer nozzle for the hot water supply;

Fig. 6 is a plan view of the equalizer pan; and

Fig. 7 is a cross section of another type of apparatus which may be used with my invention.

In the drawings, I have shown a coffee apparatus comprising a hot water jacket 1, having a filling opening 2 at the side thereof for the introduction of a body of hot water 3, which is kept hot by the application of heat to the bottom of the jacket, any steam thus formed being allowed to pass out also through the filling opening 2. Within the jacket 1 there is provided an urn 4 made of porcelain, or any other suitable material, adapted to receive brewed coffee, a faucet 5 with a hand-valve 6 being provided for the withdrawal of the brewed coffee. Near the top of the urn 4 there is a seat 7 for receiving an equalizer pan 8 provided with a central opening 9 and a peripheral set of apertures 10, the openings 9 and 10 being of such a size as to cause the accumulation of the strong brewed coffee therein before passing out through said openings to the bottom of the urn 4 for mixing with the brewed coffee therein. At the top of the apparatus there is a removable section 11 having therein a plurality of radially directed hinged brackets 12 supported from the inner wall of the removable section 11, each of said brackets 12 having at its end an upwardly directed pin 13 for engagement with a coffee-filter-cloth 14, which is approximately hemispherical in shape, and which is supported at its edges by means of a metal ring 15. The pins 13 are engaged with the filter-cloth 14 just inside of the ring 15. A cover 16 is arranged to be removably applied to the top of the removable section 11, but in such a manner as to permit at one edge thereof, the entry of a hot water supply valve pipe 17 which enters at the side of the removable section 11 and has a vertical end 18 provided at its lowermost portion with a circular nozzle 19 having eight horizontally directed radiating holes 20 and sixteen upwardly directed holes 20$^a$ therein, all the holes being preferably of the same size, although the size and number of which may be varied according to the distribution of hot water desired in the particular apparatus. The holes 20$^a$ are located in a screw-threaded cleanout cap 20$^b$ which is a part of the nozzle. The outer end of the pipe 17 has a downwardly directed portion 21 which is connected by a hinged shut-off valve 22, which closes when the pipe 17 is raised to a vertical position, to a pipe 23 leading to a pressure hot-water supply tank 24 provided with heated water by a valve inlet pipe 25.

In Fig. 7 I have shown a modified form of apparatus for use in carrying out my invention, in which, instead of the pan 8 there is a cup 26 formed integral with the urn, having a lower aperture 27 comparable to the aperture 9, and instead of having the holes 10, the liquid can overflow over the edge of the cup when the latter is full.

In the operation of the apparatus which may be used with my invention, a quantity of the ground coffee, which may be finer than the coffee previously found suitable in the brewing of coffee, is placed in the coffee-filter-cloth 14, which is then inserted into the removable section 11 of the apparatus in such a manner that the swinging brackets 12 have their pins 13 inserted into the filter-cloth just inside of the ring 15. The hinged pipe 17 is then pushed into the body of ground coffee until the circular nozzle 19 is in the middle of the body of coffee and at the bottom thereof. Or, if desired, these steps may be reversed by inserting the nozzle 19 into the filter-cloth 14 after the latter has been supported on the brackets 12 and the very finely ground coffee might be introduced thereafter to the desired depth in the filter-cloth 14. A supply of hot water will also be introduced into the water jacket 1 to the desired level. Thereupon, the valve in the pipe 17 is opened to provide a supply of hot water to the body of coffee in the apparatus. Because of the laterally and upwardly directed openings in the nozzle 19 the ground coffee will not only become loosened during the application of the water fed into the same but the body of coffee will rise upwardly along the sides of the filter-cloth 14 in the direction of exit of the body of water through the cloth, and some water will, of course, accumulate in the pocket thus formed above the body of coffee. The circulation of the grounds by the action of the water at the bottom of the cotton filter cloth permits immediate dripping of the brewed coffee into the urn and as this first extraction is from only a portion of the grounds, it is nearer in strength to the average of the whole brew than has previously been possible, thus making it feasible to serve the coffee while it is being brewed and without any repouring or mixing. As the brewing proceeds the liquid coffee will be received into the pan 8 where it will drip out very gradually into the urn 4, thus causing an effective mixing of the brewed coffee to prevent any stratification of the same with consequent undesirable variation in the strength of the coffee drawn off from the faucet 5. The brewed coffee can thus be served at once from the urn 4 before the brew is completed, thus avoiding the usual delay which is caused by the necessary mixing of the brewed coffee. When the required amount of coffee has been brewed the valve in the pipe 17 will, of course, be closed, and when the brewing has been entirely completed the removable section 11 may be, if desired, lifted off from the top of the apparatus and the lid 16 may be placed on top of the urn 4 in the water jacket 1.

Briefly, it will be noted, thus, that in the operation of my process the water passes out in two directions from the nozzle, horizontally and upwardly. The horizontal streams of water loosen the grounds and build them up in a curved layer on the wall of the bag, and the upwardly directed currents cause the water to lift and penetrate the grounds, thus preventing them from forming lumps surrounded by a skin of water. Consequently, some of the water carrying the coffee extract goes directly down through the bottom of the bag from the center of the pocket found in the upper surface of the body of coffee, and thence into the bottom of the urn. This coffee extract carries the desirable flavor elements but not the deleterious substance which would result from an unduly long extraction, and the same favorable action takes place with the water passing upward. But the coffee grounds at the top of the bag remain only partially extracted until later in the coffee extracting operation, so as to supply coffee extract in a later stage of the coffee extracting operation. In this process, accordingly, the grounds become thoroughly mixed with the water even when the coffee is ground to the finest degree. This provides a more perfect coffee extract while using a smaller amount of coffee for the same strength extract than would otherwise be the case. Furthermore, by my process, while obtaining a thorough contact of the water and the ground coffee the time of contact can be regulated so as to insure quick brewing while avoiding over-extraction, thus avoiding the extraction of the deleterious materials from the coffee bean. Also, the water is maintained at a higher and more uniform temperature than would otherwise be the case. By receiving the coffee extract in the pan 8, whence it will drip out gradually into the bottom of the urn, there is obtained an effective mixing of the brewed coffee to prevent any stratification of the same, as above pointed out.

While I have described my invention above in detail I wish it to be understood that many changes may be made therein without departing from the spirit of the same.

I claim:

1. The process which comprises brewing coffee by simultaneously applying upwardly and laterally directed jets of hot water to a body of ground coffee at a point near the bottom of the body of ground coffee and on the interior thereof.

2. The process which comprises brewing coffee by simultaneously applying upwardly and laterally directed jets of hot water in radial streams to a body of ground coffee at a point near the bottom of the body of ground coffee and on the interior thereof.

3. The process which comprises brewing coffee by applying upwardly and laterally directed jets of hot water in radial streams to a body of ground coffee at a point near the bottom of the body of ground coffee and on the interior thereof, to loosen the body of ground coffee and form an elevated layer around the upper edge of the same.

4. The process which comprises brewing coffee by applying upwardly and laterally directed jets of hot water in radial streams to a body of ground coffee at a point near the bottom of the body of ground coffee and on the interior thereof, to loosen the body of ground coffee and form an elevated layer around the upper edge of the same, and extracting the flavor from the elevated layer relatively late in the operation.

5. The process which comprises brewing coffee by applying a supply of hot water to a body of ground coffee at a point near the bottom of the body of ground coffee and on the interior thereof, allowing the extracted coffee to drip from the body of ground coffee and accumulating the successive drippings so as to intermingle the same while drawing the coffee extract off from the body of intermingled liquid more slowly than the accumulation of the drippings of coffee extract from the body of ground coffee.

6. The process which comprises brewing coffee by applying a supply of hot water in radial streams to a body of ground coffee at a point near the bottom of the body of ground coffee and on the interior thereof, allowing the extracted coffee to drip from the body of ground coffee and accumulating the successive drippings so as to intermingle the same while drawing the coffee extract off from the body of intermingled liquid more slowly than the accumulation of the drippings of coffee extract from the body of ground coffee.

7. The process which comprises brewing coffee by applying a supply of hot water in radial streams to a body of ground coffee at a point near the bottom of the body of ground coffee and on the interior thereof, thus loosening the body of ground coffee and forming an elevated layer around the upper edge of the same, allowing the extracted coffee to drip from the body of ground coffee and accumulating the successive drippings so as to intermingle the same while drawing the coffee extract off from the body of intermingled liquid more slowly than the accumulation of the drippings of coffee extract from the body of ground coffee.

8. The process which comprises brewing coffee by applying a supply of hot water in radial streams to a body of ground coffee at a point near the bottom of the body of ground coffee and on the interior thereof, thus loosening the body of ground coffee and forming an elevated layer around the upper edge of the same, which is the last portion of the body of coffee to be fully extracted, allowing the extracted coffee to drip from the body of ground coffee and accumulating the successive drippings so as to intermingle the same while drawing the coffee extract off from the body of intermingled liquid more slowly than the accumulation of the drippings of coffee extract from the body of ground coffee.

9. The process which comprises brewing coffee by applying hot water to a body of coffee near the bottom of the body of coffee and allowing the extracted coffee to drip from the body of ground coffee, and accumulating the successive drippings so as to intermingle the same while drawing the coffee extract off from the body of intermingled liquid more slowly than the accumulation of the drippings of coffee extract from the body of ground coffee.

10. The process which comprises brewing coffee by applying upwardly and laterally directed jets of hot water to a body of ground coffee at a point near the bottom of the body of ground coffee and on the interior thereof, the laterally directed jets being below the upwardly directed jets.

11. The process which comprises brewing coffee by applying upwardly and laterally directed jets of hot water to a body of ground coffee at a point near the bottom of the body of ground coffee and on the interior thereof, the laterally directed jets being below and fewer in number than the upwardly directed jets.

In testimony that I claim the foregoing, I have hereunto set my hand this 7th day of December, 1928.

EDWARD ABORN.